Jan. 15, 1957  T. W. JOHNSON ET AL  2,777,377
DRIVE-IN CULTIVATOR SUPPORT FOR TRACTORS
Filed July 22, 1953  2 Sheets-Sheet 1

INVENTORS.
THEODORE W. JOHNSON
GEORGE DWIGHT HUNTER
BY
Roger C. Johnson
ATTORNEY Jan. 15, 1957  T. W. JOHNSON ET AL  2,777,377
DRIVE-IN CULTIVATOR SUPPORT FOR TRACTORS
Filed July 22, 1953  2 Sheets-Sheet 2

INVENTORS.
THEODORE W. JOHNSON
GEORGE DWIGHT HUNTER
BY
Roger C. Johnson
ATTORNEY

United States Patent Office 2,777,377
Patented Jan. 15, 1957

2,777,377

DRIVE-IN CULTIVATOR SUPPORT FOR TRACTORS

Theodore W. Johnson and George Dwight Hunter, Des Moines, Iowa, assignors to Deere Manufacturing Co., Dubuque, Iowa, a corporation of Iowa Application July 22, 1953, Serial No. 369,568

3 Claims. (Cl. 97—47.15)

The present invention relates generally to agricultural implements and more particularly to tractor-mounted cultivators and similar machines.

The object and general nature of the present invention is the provision of a new and useful improvement in tractor-mounted cultivators, especially adapted for use with four-wheel tractors having spaced apart front and rear wheels, particularly tractors wherein the spacing between the front wheels, as well as between the rear wheels, is relatively great, as when the tractor is adapted for use in sections or territories where listed crops are customary. More specifically, it is a feature of this invention to provide a tractor-mounted cultivator that is so constructed and arranged as to be quickly attachable and detachable. Particularly, it is a feature of this invention to provide an implement, such as a cultivator, having attachment frame structure and tool-receiving means so constructed and arranged that the tool means may be swung laterally outwardly and forwardly, to accommodate driving the tractor into the cultivator or backing the tractor out of the cultivator, the parts being so constructed and arranged that when shifting the side frame means into and out of position, the tool means swings with ample clearance back of the relatively widely spaced apart front wheels and in front of the correspondingly spaced rear wheels. It is also another feature of this invention to provide a tractor frame with structure so constructed and arranged that ample space is provided for vertical oscillation of the tractor front wheels, as may be required when the front axle of the tractor swings about its pivot at the front of the tractor when passing over uneven ground or the like.

These and other objects and advantages of the present invention will be apparent to those skilled in the art after a consideration of the following detailed description, taken in conjunction with the accompanying drawings, in which.

Figure 1:
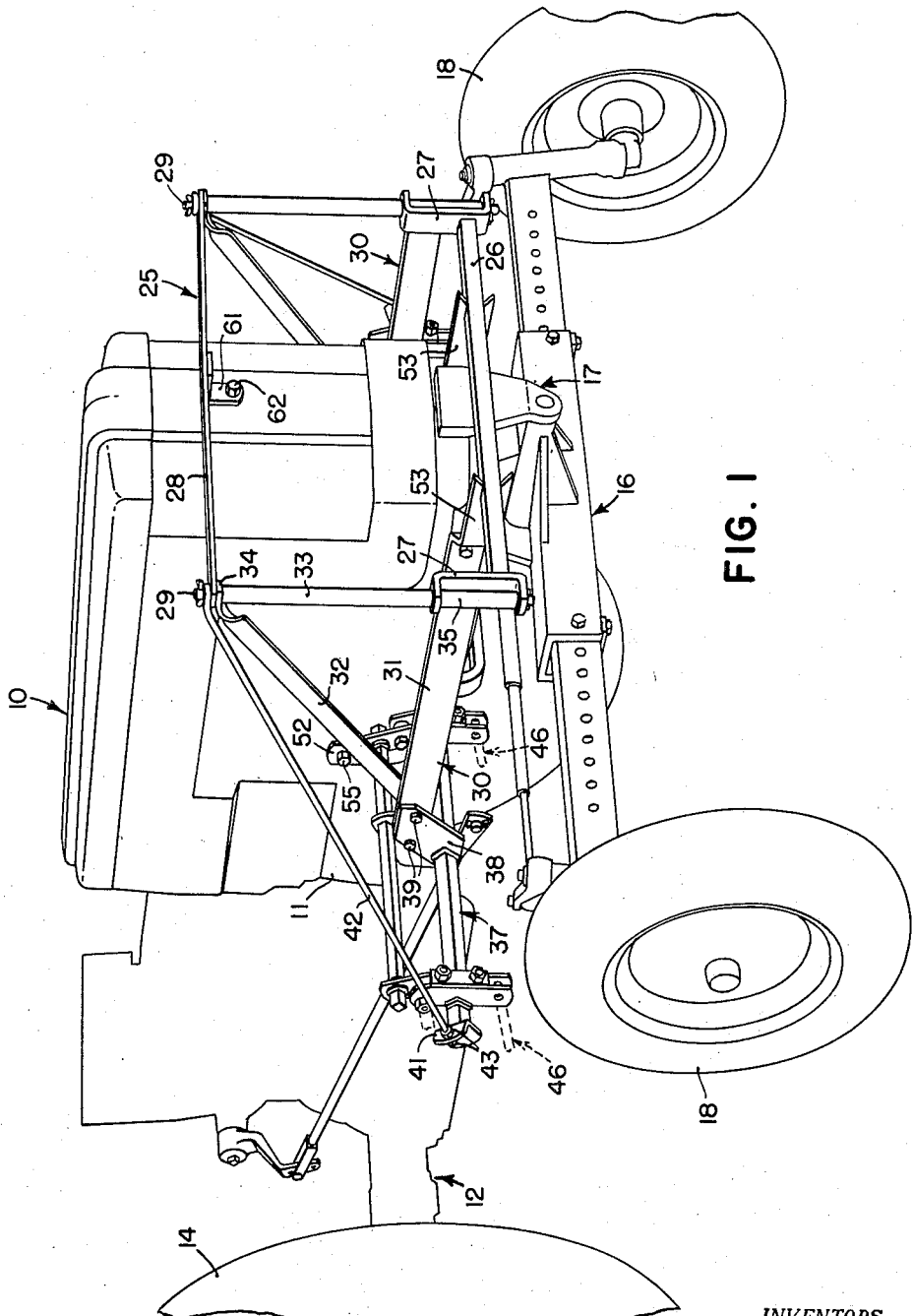
Fig. 1 is a perspective view showing a tractor-mounted cultivator in which the principles of the present invention have been incorporated.

Referring first to Fig. 1, the present invention has been illustrated as incorporated in an agricultural machine especially adapted for attachment to a four-wheel tractor having relatively widely spaced front and rear wheels. The tractor is indicated in its entirety by the reference numeral 10 and includes a relatively narrow body 11 supported at its rear end on a rear axle structure 12 to the axles 13 of which rear laterally spaced apart drive wheels 14 are affixed. The front end of the tractor is supported on a front axle 16 by a swivel mounting 17 that accommodates movement of the axle 16 relative to the tractor about a generally fore-and-aft extending axis. The axle 16 is relatively long and at its ends swingably receives relatively widely spaced apart steerable front wheels 18. When used with implements for listed crops the front wheels 18 are spaced apart laterally substantially the same distance as the spacing between the rear drive wheels 14, most if not all of the tools operating on the listed crops being disposed between the vertical fore-and-aft extending planes passing through the front and rear wheels and the tractor.

The implement chosen to illustrate the principles of the present invention is shown as a tractor-mounted cultivator constructed and arranged to cultivate two rows. The implement is shown as including, among other things, a front transverse frame structure 25 that is made up of a lower frame bar 26 to the ends of which generally U-shaped, vertically disposed apertured yokes 27 are fixed, as by welding or the like. The front frame structure 25 also includes an upper transverse bar 28, and at each end of the transverse frame structure 25 there is a vertically disposed truss rod support member 29, in the form of a shaft or rod. Swingably mounted on each end of the front transverse frame 25, through the associated rod 29, is a rearwardly extending frame structure 30 that is made up of a lower horizontal bar 31 and a generally diagonally disposed bar 32 connected, as by welding, at its rear end to the rear end of the bar 31 and extending upwardly and forwardly to a point adjacent the upper end of the associated truss rod support member 29. The forward and upper end of each of the members 32 is apertured to receive the upper end of the associated support rod 29. A spacing sleeve 33 is disposed about each of the support rods 29 and extends from the upper end 34 of the diagonal frame structure member 32 downwardly to the upper part of the adjacent yoke 27. Secured to the forward end of each of the horizontal frame bars 31 is a vertical sleeve section 35, and this section is disposed about the lower end of the associated support rod 29, the lower end of which extends downwardly through the lower apertured portion of the associated yoke 27.

Secured to the rear portion of each of the rearwardly extending frame structures 30 is a transverse tool-receiving bar 37 which, between its ends, carries an attaching bracket 38 that is apertured to receive a pair of bolts 39 by which the bar 37 may be secured to the rear end of the horizontal frame bar 31. The laterally outer end of each of the tool-receiving bars 37 carries a bracket 41 to which the rear and lower end of a truss rod 42 is adjustably connected, as by a pair of lock nuts 43. The upper end of each of the truss rods 42 is apertured and disposed over the upper end of the associated truss rod support member 29. It will be noted that, in the structure just described, there is what might be termed an open unobstructed space below the plane that contains the members 32 and 42 and laterally outwardly of the plane that contains the members 31 and 32. Into this space the adjacent front wheel 18 may readily be moved, as when the tractor wheel is steered in one direction or the other, or when the tractor tilts relative to the front axle 16. Cultivator rig units, indicated in their entirety by the reference numeral 46, are secured to the bar 37 in laterally spaced apart relation, certain of said rig units being disposed laterally inwardly of the associated rearwardly extending frame structure 30. The present invention is not particularly concerned with the details of the cultivator rigs and associated ground-working shovels and/or other parts, and hence further description is believed to be unnecessary.

The laterally inner end of each of the tool-receiving bars 37 carries an attaching bar or plate 48 that, in the operating position of the implement, is adapted to be rigidly connected to the tractor. To this end, and according to the principles of the present invention, a pair of generally fore-and-aft extending supporting bars 51, each having an upturned portion 52 at its rear end, are more or less permanently fixed to the tractor. Each of the bars 51 includes an outwardly offset section 53 formed with a forward notched portion 53a, shaped and dimensioned to snugly receive the end portions of the transverse frame bar 26, the bars 51 being adapted to be securely fixed to the tractor by attaching bolts 54 and 55.

Each of the attaching plates 48 is adapted to be rigidly fixed to the associated supporting bar 51, and to this end, the rear portion of each attaching plate 48 is provided with a centering cone 56 adapted to enter an enlarged hole 57 formed in the associated supporting bar 51. The forward portion of the attaching plate is apertured to receive a fastener 58, such as a bolt or the like, and rearwardly of the cone member 56, the plate 48 is apertured, as at 59, to receive a second fastener 60.

The operation of the implement of the present invention is substantially as follows.

Figure 2:
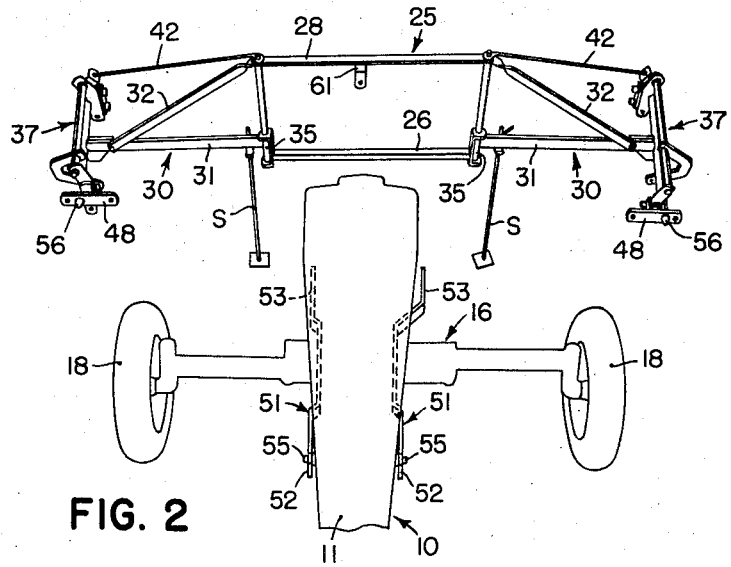
Fig. 2 is an overhead perspective view showing the position of the cultivator just prior to its connection with the tractor, the parts of the cultivator being shown in a position to receive the front of the tractor as the latter is driven into the cultivator.
Figure 3:
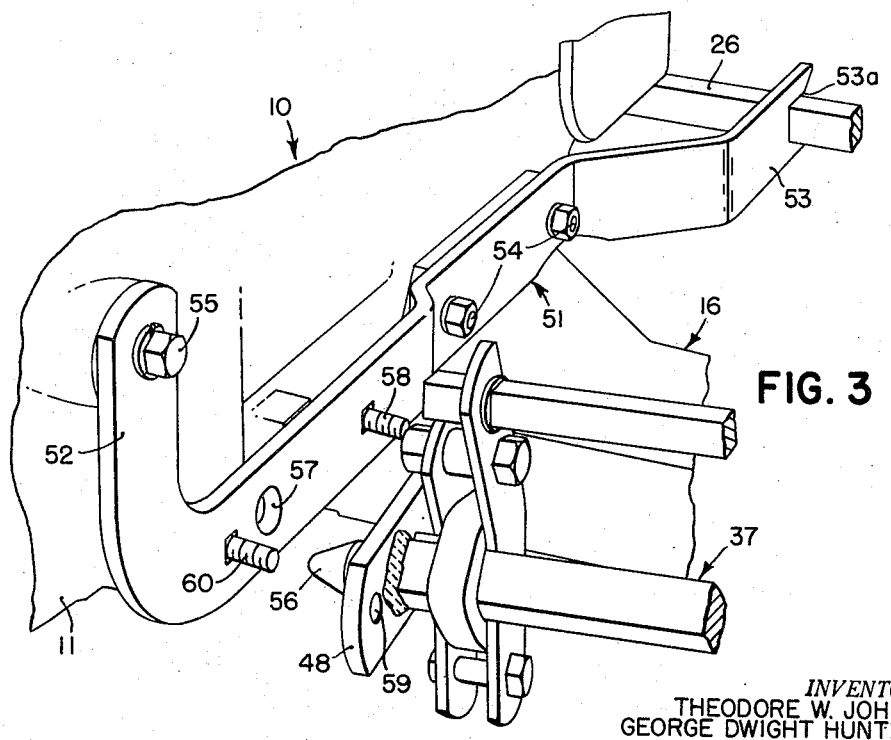
Fig. 3 is an enlarged perspective showing the details of the attaching mechanism.

When it is desired to attach the implement to the tractor, the latter is driven up to the implement in substantially the manner indicated in Fig. 2, in which the implement, for storage purposes, is supported with the rearwardly extending frame structure 30 swung outwardly into a transverse position in alinement with the front frame structure 25, the central portions being supported on stands S and the outer portions on the cultivator rigs (not shown). The upper transverse bar 28 of the transverse structure 25 carries an attaching lug 61 that is apertured to receive and pass over a stud 62 carried at the front of the tractor. The tractor is first driven into a position to permit the lug 61 to be engaged over the stud 62, at which time the end portions of the lower transverse bar 26 enter the notches 53 in the front end s of the supporting bars 51. The latter members normally are left on the tractor as a permanent part thereof, but that is not essential, and functionally they form a part of the implement.

Next the two rearwardly extending frame structures 30, with the associated tool-receiving bars and cultivator rigs, or other tools associated therewith, are swung around rearwardly and laterally until the cone members 56 on the attaching plates 48 enter the apertures 57 in the supporting bars 51. Lastly the fasteners 58, 60 are then inserted in place and tightened. The implement is then in a position to operate as is illustrated in Fig. 1. From the latter figure it will be noted that the support rods 29, forming pivots between the transverse or front frame structure 25 and the rearwardly extending frame structures 30 and associated parts, are disposed in such positions relative to the tractor and the supporting front and rear wheels that when the tools are swung inwardly or outwardly to and from operating and storage positions, the front tools, although normally in operating position within the planes of the front and rear wheels and lying between said planes and sides of the tractors, clear the rear portion of the front wheels when the tool units are swung into and out of operating or attached positions. Likewise, the rear tools clear the front portions of the rear wheels 14. Thus, the tools, which normally occupy a position laterally inside the fore-and-aft planes of the tractor wheels, may readily be moved laterally outwardly and forwardly, passing through the spaces between the front and rear wheels of the tractor, at each side thereof, without interference, being moved into a position, such as shown in Fig. 2, where the tractor may readily be backed away from the implement when disconnecting the latter from the tractor and thus releasing the latter for other service.

It will also be noted that when the implement is in an operating position, there is sufficient clear unobstructed space adjacent the front wheels of the tractor, particularly above and laterally inwardly thereof, to accommodate both vertical swinging of the wheels as the outfit passes over uneven ground and also laterally inward swinging of the rear portion of the front wheels as the latter are steered. This feature is particularly important, especially in row spacings that may require a somewhat more narrow setting than is indicated in Figs. 1 and 2.

While we have shown and described above the preferred structure in which the principles of the present invention have been incorporated, it is to be understood that our invention is not to be limited to the exact details, shown and described above, but that, in fact, widely different means may be employed in the practice of the broader aspects of our invention.

What we claim, therefore, and desire to secure by Letters Patent is:

1. An implement adapted to be detachably mounted on a tractor of the four-wheel type, having a front axle and two relatively widely spaced apart front steerable wheels, said implement comprising a transverse frame structure detachably connectible to the front of the tractor adjacent the transverse vertical plane of said front axle, a pair of generally rearwardly extending frame structures, one pivoted at its forward end to each end of said transverse frame structure and normally lying laterally inwardly of said front wheels, and a tool-receiving bar fixed at a generally central portion to the rear portion of each of said rearwardly extending frame structures and extending laterally outwardly therefrom, tool-receiving means carried by each of said tool-receiving bars generally at opposite sides of the generally vertical fore-and-aft extending plane of the associated generally rearwardly extending frame structure, the points of pivotal connection between said rearwardly extending frame structures with the ends of said transverse frame structure at each side of the tractor being located in the plane of the associated rearwardly extending frame structure, whereby when the rearwardly extending frame structures are swung laterally outwardly the forwardmost tool means clear the front wheels of the tractor and the rearmost tool means clear the rear wheels of the tractor and means on said tool receiving bars for detachably connecting the bars to the tractor body to position the bars transverse to the direction of travel of the tractor.

2. An implement adapted to be detachably mounted on a tractor of the four-wheel type, having a front axle, swingable relative to the tractor about a generally fore-and-aft extending axis, and two relatively widely spaced apart front steerable wheels, said implement comprising a transverse frame structure including upper and lower sections attachable to the front of the tractor and extending laterally outwardly beyond the sides of the tractor, a rearwardly extending frame structure pivoted at its forward portion to each end of said transverse frame structure, each of said rearwardly extending frame structures including a lower generally horizontal bar pivotally connected at its forward end with the adjacent portion of the lower section of said transverse frame structure and a brace member extending from the rear end portion of said generally horizontal bar forwardly and upwardly to the adjacent portion of the upper section of said transverse frame structure, a transverse tool-receiving frame bar fixed at an intermediate point to the rear end portion of each of said rearwardly extending frame structures, a truss rod connected at its outer end to the laterally outer end of each transverse frame bar and extending upwardly and laterally inwardly to a point of connection with the adjacent portion of the upper section of said transverse frame structure, thereby providing substantially unobstructed open portions immediately above said front tractor wheels so as to accommodate generally vertical and steering movements of said front wheels when said front axle swings about said fore-and-aft extending axis, and tool-receiving means carried by the end portions of each of said transverse bars on opposite sides of the plane of the associated lower horizontal bar and brace member.

3. An implement adapted to be detachably mounted on a tractor having a longitudinally extending tractor body, a pair of laterally spaced apart rear wheels, and two relatively widely spaced apart front steerable wheels, each of the latter being positioned at determinable distances from the tractor body and the rear wheels, said implement comprising: a pair of tool assemblies including tool supporting members; a transverse frame detachably connected to the front of the tractor and supporting vertical pivots at opposite ends thereof and intermediate the front wheels and the tractor body; a pair of elongated frame structures, each structure having one end mounted on a respective vertical pivot and adapted to swing over a front wheel and having an opposite end thereof connected to one of the tool assemblies, the vertical pivots being so spaced from the tractor body and the lengths of the frame structures being such that as the tool assemblies are swung between inoperative positions laterally outwardly of the front wheels and operative positions laterally inwardly of and rearwardly of the front wheels said tool assemblies will pass between the front and rear wheels; and means on the tool supporting members detachably connecting the members to the tractor body for fixing the tool assemblies in their operative position.

References Cited in the file of this patent

UNITED STATES PATENTS

| | | |
|---|---|---|
| 1,776,242 | Altgelt | Sept. 23, 1930 |
| 1,854,834 | Graham | Apr. 19, 1932 |
| 2,423,148 | Johnson | July 1, 1947 |
| 2,560,702 | Reaves | July 17, 1951 |
| 2,613,583 | Blaydes et al. | Oct. 14, 1952 |